United States Patent [19]
Momiyama

[11] Patent Number: 4,474,448
[45] Date of Patent: Oct. 2, 1984

[54] FOCUS DETECTION DEVICE

[75] Inventor: Kikuo Momiyama, Kanagawa, Japan

[73] Assignee: Canon Kabushiki Kaisha

[21] Appl. No.: 504,983

[22] Filed: Jun. 16, 1983

[30] Foreign Application Priority Data

Jul. 14, 1982 [JP] Japan ................... 57-123605

[51] Int. Cl.³ .............................................. G03B 13/18
[52] U.S. Cl. .................................................. 354/407
[58] Field of Search ........................................ 354/407

[56] References Cited
U.S. PATENT DOCUMENTS 4,180,309 12/1979 Miyata et al. ................. 354/407

FOREIGN PATENT DOCUMENTS 0007323 1/1979 Japan ................... 354/407

Primary Examiner—Russell E. Adams
Attorney, Agent, or Firm—Toren, McGeady and Stanger

[57] ABSTRACT

A focus detection device for detecting the in-focus condition of an objective lens by arranging in rear of an image of an object to be photographed by said objective lens, second-image forming lenses for reforming said object image on the surfaces of photo-sensitive elements, wherein the output signals from said photo-sensitive elements are used to indicate the detection of the in-focus condition, whereby said second-image forming lenses are constructed in proper form to increase the accuracy of detection of the in-focus condition.

10 Claims, 14 Drawing Figures

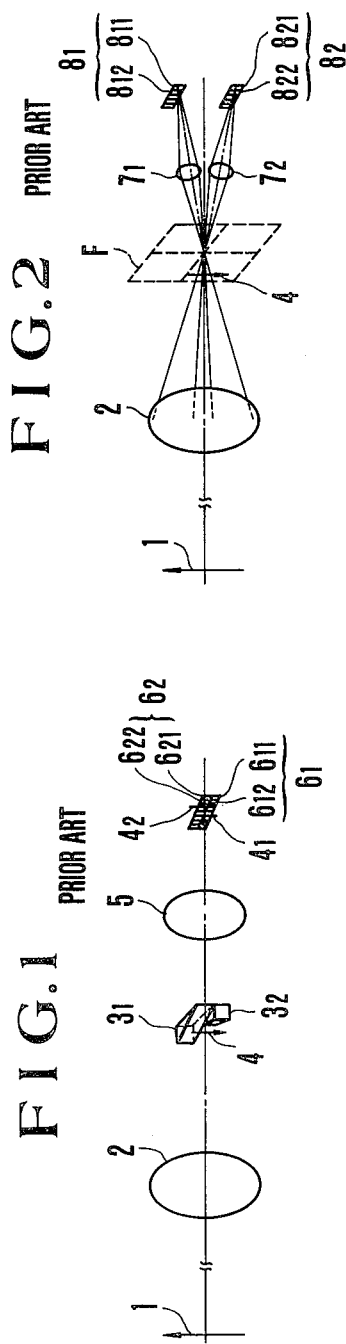

SPHERICAL ABERRATION
SINE CONDITION

CURVATURE OF FIELD

DISTORTION

SPHERICAL ABERRATION
SINE CONDITION

CURVATURE OF FIELD

DISTORTION

SPHERICAL ABERRATION
SINE CONDITION

CURVATURE OF FIELD

DISTORTION ll
FOCUS DETECTION DEVICE

BACKGROUND OF THE INVENTION

1. Field of the Invention

This invention relates to focus detection devices for photographic lenses, zoom lenses or other optical instruments (hereinafter merely referred to as "objective lens"), and more particularly to focus detection devices which can provide an improved optical performance with increased accuracy of focus detection.

2. Description of the Prior Art

From the past, it has been known in the art to provide the so-called secondary image forming type in-focus detecting method in which, in rear of an image of an object to be photographed formed by an objective lens, there is arranged an additional lens for forming a second image of the object on the surface of photo-sensitive elements so that the photo-sensitive elements produce signals representing the degree of sharpness of the image formed thereon, the signals being used in detecting when the objective lens is in focus as, for example, disclosed in U.S. Pat. Nos. 3,511,156, 3,875,401 and 3,860,935.

FIGS. 1 and 2 are schematic views of optical systems for the conventional secondary imaging type in-focus detecting method.

In FIG. 1, an image 4 of an object 1 to be photographed is formed by an objective lens 1 near split prisms $3_1$ and $3_2$, divided into upper and lower or two parts by the split prisms $3_1$ and $3_2$ and then reformed by a second-image forming lens 5 on a pair of photo-sensors $6_1$ and $6_2$ as separate images $4_1$ and $4_2$ from each other. The photo-sensors $6_1$ and $6_2$ each consist of a plurality of elements $6_{11}, 6_{12}, \ldots$ or $6_{21}, 6_{22}, \ldots$. By using output signals from these photo-sensitive elements, the in-focus condition of the objective lens 2 is detected.

That is, when the objective lens 2 is in focus, the object image 4 after having been separated to the two images by the split prisms $3_1$ and $3_2$ is reformed as two images vertically exactly equivalent to each other on the surfaces of the photo-sensitive elements $6_1$ and $6_2$. When the objective lens 2 is out of focus, after having similarly been separated by the split prisms $3_1$ and $3_2$, it is reformed as two images of unsharp degree in horizontally sheared relation on the surfaces of the photo-sensitive elements $6_1$ and $6_2$.

Therefore, upon detection of the amount of shearing of these two images by the photo-sensitive elements $6_1$ and $6_2$, the out-of-focus condition can be detected. It is to be noted in this connection that whether or not the optical performance of the second-image-forming lens 5 is good contributes one factor on which the accuracy of detection of the in-focus condition depends.

FIG. 2 illustrates another method which is to use a pair of second-image forming lenses $7_1$ and $7_2$ arranged in rear of the prescribed focal plane F of the objective lens 2 symmetrically with respect to the optical axis of the lens 2 so that the image 4 of the object 1 is divided into two images by the second-image forming lenses $7_1$ and $7_2$ on respective photo-sensors $8_1$ and $8_2$ each consisting of a plurality of elements $8_{11}, 8_{12}, \ldots$ or $8_{21}, 8_{22}, \ldots$ When the objective lens 2 is in focus, the two images on the surfaces of the photo-sensors $8_1$ and $8_2$ take their places in vertically equivalent positions to each other. When out of focus, the two images on the surfaces of the photo-sensors $8_1$ and $8_2$ are of unsharp degree in horizontally sheared relation to each other. By sensing the amount of shearing of the images, the in-focus condition is detected.

As in the above, the in-focus detection device of FIG. 2 makes use of a pair of second-image forming lenses $7_1$ and $7_2$ in rear of the prescribed focal plane F of the objective lens in combination with a pair of photo-sensitive element arrays in optically equivalent positions to the two images by this pair of second-image forming lenses $7_1$ and $7_2$, thereby the outputs from the two photo-sensitive element arrays are compared with each other to distinguish the degrees of sharpness and unsharpness from each other.

Since the object image by the objective lens 2 is re-formed by the second-image forming lens near the pair of photo-sensitive element arrays in detecting the in-focus condition of the objective lens 2, the imaging performance of the second-image forming lens gives a large influence to the accuracy of detection of the in-focus condition.

Because it has been the prior art practice that the second-image forming lens is constructed from one positive lens, the second image on the photo-sensitive element is associated with large aberrations. Therefore, it cannot be said that the accuracy of detection of the in-focus condition is satisfactory.

SUMMARY OF THE INVENTION

An object of the present invention is to provide an in-focus detection device employing the secondary imaging type focus detecting method wherein use is made of second-image forming lenses well corrected in aberrations to increase the accuracy of detection of the in-focus condition.

To achieve the object of the present invention, the focus detection device having second-image forming lenses arranged in rear of the object image formed by the objective lens to reform said object image on the photo-sensors with the use of the output signals from the photo-sensors in detecting when the objective lens is in focus has the feature in that the design of the second-image forming lens in such a way that a plurality of lens elements are used, and the plurality of lens elements are configured to proper shapes and made of suitable materials with an advantage of increasing the accuracy of detection of the in-focus condition.

BRIEF DESCRIPTION OF THE DRAWINGS

FIGS. 3, 5 and 7 are longitudinal section views of specific examples 1, 2 and 3 of the second-image forming lens usable in the focus detection device of the present invention.

FIGS. 4-1 through -3, FIGS. 6-1 through -3 and FIGS. 8-1 through -3 are graphic representations of the various aberrations of the lenses of FIGS. 3, 5 and 7 respectively.

DETAILED DESCRIPTION OF THE PREFERRED EMBODIMENTS

Figures 1, 4:
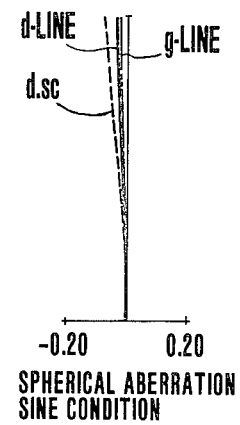
Figures 2, 4:
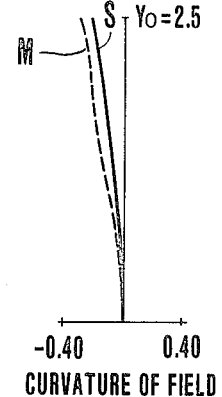
Figures 3, 4:
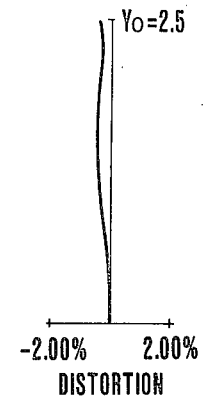
Figures 1, 6:
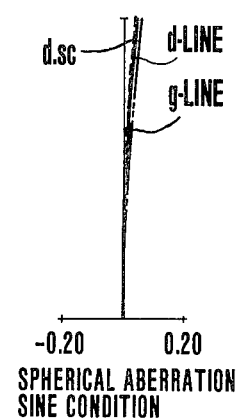
FIGS. 1 and 2 are schematic views of conventional optical systems employing the secondary imaging type in-focus detecting method.
Figures 2, 6:
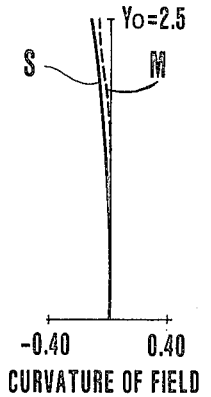
Figures 3, 6:
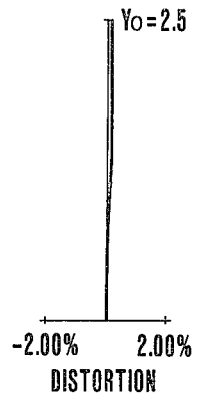
Figures 1, 8:
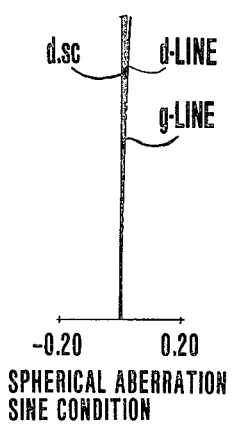
Figures 2, 8:
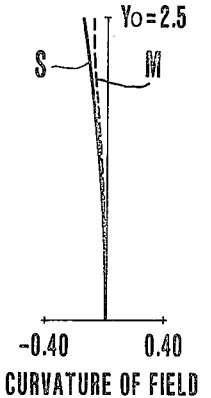
Figures 3, 8:
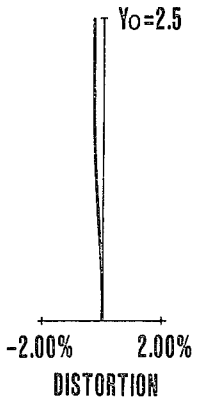

The second-image forming lens used in the focus detection device according to the present invention comprises at least one positive lens and at least one negative lens satisfying the following relationship:

$$\nu+ > \nu-$$

where $\nu+$ is the mean value of the Abbe numbers of the media of the positive lenses, and $\nu-$ is the mean value of the Abbe numbers of the media of the negative lenses.

The aforesaid second-image forming lens usable in the focus detection device is, because of the necessity of making the paired images on the photo-sensors for focus detection symmetrical to each other, required to be corrected well particularly with respect to off-axis aberrations. In general, the field of view of the focus detection is desired to be about 5 mm at the primary image plane, and the focal length of the second-image forming lens is, from the standpoint of aberration correction, preferably made as long as possible. From the standpoint of the available space for incorporation within the camera housing, on the other hand, the distance between the first and second images is preferably made as short as possible. For example, the 35 mm single lens reflex camera is taken with its arrangement in the bottom portion thereof. Upon consideration of the size of the space of the bottom portion, it is then required that the distance between the first and second images be less than about 20 mm.

Also, taking into account the prerequisites that the size of the photo-sensor for focus detection relative to the field of view of the focus detection at the focal plane of the objective lens is comparatively small, and that the focal length of the second-image forming lens relative to the image distance is as long as possible, it is desired that the image magnification of the second-image forming lens is about 0.7–0.3.

From the relationship of these factors, it is preferred that the focal length F of the second-image forming lens is about 3–5 mm.

In any case, as the second-image forming lens, use must be made of one having a short focal length with good imaging performance.

According to the present invention, the second-image forming lens is constructed with at least one positive lens and at least one negative lens. This feature makes it possible to achieve a good correction of spherical aberration, coma and field of curvature. Another feature regarding the values of the Abbe numbers of the media of the positive and negative lenses is to make the mean value of the Abbe numbers of the media of the positive lenses larger than that of the Abbe numbers of the media of the negative lenses with an advantage of making it possible to well correct chromatic aberrations. As a whole, obtained is a second-image forming lens of good imaging performance.

And in order to facilitate a better achievement of the object of the invention, the second-image forming lens is constructed by using three lens elements, or, from front to rear, a bi-convex first lens, a bi-concave second lens and a bi-convex third lens. And, further, it is preferred that letting Ri denote the radius of curvature of the i-th surface counting from front, the following conditions are satisfied:

$$R1 < |R2|$$

$$R5 > |R6|$$

Thus, the second-image forming lens is constructed in the form of the triplet type with the bi-convex lens, bi-concave lens and bi-convex lens and is well corrected for off-axis or unsymmetrical aberrations. Further in order to well correct spherical aberration, concerning the radii of curvature of the lens surfaces of the first and third lens elements, the conditions that $R1 < |R2|$ and $R5 > |R6|$ are given.

To facilitate a furthermore improvement of the imaging performance, at least one of the lens surfaces in the second-image forming lens is made aspheric and, by figuring this aspheric surface as expressed by the following formula:

$$X = \frac{Y^2}{Ra - Ra\sqrt{1 - \left(\frac{Y}{Ra}\right)^2}} + BY^4 + CY^6 + DY^8 + EY^{10} + \ldots$$

where Ra is the radius of curvature of the paraxial region of the aspheric surface, X-axis is in the optical axis with the direction in which the light advances taken as positive, and Y-axis is in a direction perpendicular to the X-axis, the following relationship is set forth:

$$0 > (Ni' - Ni)B$$

where Ni and Ni' are the refractive indices of the media on the front and rear sides of the aspheric surface respectively.

In other words, when the first lens is selected to employ the aspheric surface, the aspheric surface is configured to such a shape that as the radial distance from the optical axis increases, the positive refractive power becomes progressively weaker than that for the paraxial radius of curvature under the condition that the aspheric coefficient B satisfies $0 > B(Ni' - Ni)$. Further to well correct the chromatic aberrations, the mean value of the Abbe numbers of the media of the positive lenses is made almost equal to 2 times the mean value of the Abbe numbers of the media of the negative lenses.

Also when the second or negative lens is selected to employ the aspheric surface, the shape of the aspheric surface is defined so as to satisfy the condition $0 > B(Ni' - Ni)$.

And, the second-image forming lens may be made up of mold lenses with an advantage of manufacturing the aspheric lenses economically. If the first lens is made of acryl, the second lens of polycarbonate, and the third lens of acryl, there will be obtained a second-image forming lens well corrected in chromatic aberrations and easy to manufacture.

Next, numerical examples of the second-image forming lens of the invention are shown. In the numerical examples, Ri is the radius of curvature of the i-th surface counting from front, Di is the i-th lens thickness or air separation counting from front, and Ni and $\nu i$ are the refractive index and Abbe number of the medium of the i-th lens element counting from front respectively.

NUMERICAL EXAMPLE 1

| | f = 3.33 | | | |
|---|---|---|---|---|
| | R | D | Nd | $\nu d$ |
| 1* | 1.4800 | | | |
| | | 0.800 | 1.49171 | 57.4 |
| 2 | −3.5643 | | | |
| | | 0.052 | | |
| 3 | −4.5320 | | | |
| | | 0.300 | 1.58350 | 30.3 |
| 4 | 1.7362 | | | |

-continued

| | R | f = 3.33 D | Nd | νd |
|---|---|---|---|---|
| | | 0.189 | | |
| 5 | 4.9489 | | | |
| | | 0.800 | 1.49171 | 57.4 |
| 6 | −2.3138 | | | |

Mark * represents the aspheric surface.

Aspheric Coefficients for the R1 surface:
$B = -3.480 \times 10^{-2}$
$C = -2.035 \times 10^{-2}$
$D = 0$
$E = 0$ In this specific lens, the first and third lens elements are made up of acryl, and the second lens element of polycarbonate, and the image magnification is 0.5 times.

NUMERICAL EXAMPLE 2

| | R | f = 3.33 D | Nd | νd |
|---|---|---|---|---|
| 1* | 1.7587 | | | |
| | | 0.800 | 1.49171 | 57.4 |
| 2 | −4.5236 | | | |
| | | 0.141 | | |
| 3 | −2.8606 | | | |
| | | 0.300 | 1.5835 | 30.3 |
| 4 | 2.1597 | | | |
| | | 0.200 | | |
| 5 | 3.5042 | | | |
| | | 0.800 | 1.49171 | 57.4 |
| 6* | −1.8097 | | | |

Mark * represents the aspheric surface

Aspheric Coefficients:

| for R1 | for R6 |
|---|---|
| $B = -2.753 \times 10^{-2}$ | $B = 2.165 \times 10^{-2}$ |
| $C = 0$ | $C = 0$ |
| $D = 0$ | $D = 0$ |
| $E = 0$ | $E = 0$ |

In this example, in the front surface of the first lens element and the rear surface of the third lens element use is made of the aspheric surface. The image magnification of this example is 0.5 times.

NUMERICAL EXAMPLE 3

| | R | f = 3.33 D | Nd | νd |
|---|---|---|---|---|
| 1 | 1.6528 | | | |
| | | 1. | 1.49171 | 57.4 |
| 2 | −2.1812 | | | |
| | | 0.046 | | |
| 3* | −2.1864 | | | |
| | | 0.3 | 1.58350 | 30.3 |
| 4* | 2.9619 | | | |
| | | 0.169 | | |
| 5 | 16.8466 | | | |
| | | 2.021 | 1.49171 | 57.4 |
| 6 | −1.9533 | | | |

Mark * represents the aspheric surface.

Aspheric Coefficients:

| for R3 | for R4 |
|---|---|
| $B = -5.917 \times 10^{-2}$ | $B = 8.724 \times 10^{-3}$ |
| $C = 2.432 \times 10^{-2}$ | $C = 2.339 \times 10^{-2}$ |
| $D = 0$ | $D = 0$ |
| $E = 0$ | $E = 0$ |

In this example, the aspheric surface is used in the front and rear surfaces of the second lens of negative power. The image magnification is 0.5 times.

Though the embodiments of the invention have been described in connection with the use of acryl and polycarbonate in making up the second-image forming lens, it is of course possible to use optical glasses instead, and further to use other plastic materials provided the various conditions of the invention are satisfied.

The present invention is to provide a second-image forming lens of the character described above. According to the present invention, therefore, the use of such lens having a size allowing for incorporation in the bottom portion of a single lens reflex camera while still permitting good imaging performance provides assurance that the focus detection device can operate with high accuracy.

What I claim:

1. A focus detection device comprising:
   an objective lens and a second-image forming lens, said second-image forming lens being arranged behind a focal plane of said objective lens to reform an object image formed by said objective lens,
   photo-sensitive element groups arranged near a focal plane of said second-image forming lens, for producing output signals representing the light distribution of a second image of the object formed by said second-image forming lens, said signals being used for detecting when said objective lens is in focus, said second-image forming lens having at least one positive lens and at least one negative lens, and satisfying:

$$\nu + > \nu -$$

wherein $\nu+$ denotes the mean value of the Abbe numbers of the media of the positive lenses in said second-image forming lens, and $\nu-$ denotes the mean value of the Abbe numbers of the media of the negative lenses in said second-image forming lens.

2. A focus detection device according to claim 1, wherein said second-image forming lens has three lenses, from front to rear,
   a first lens with both of the lens surfaces being convex surfaces, a second lens with both of the lens surfaces being concave surfaces, and a third lens with both of the lens surfaces being convex surfaces.

3. A focus detection device according to claim 2, satisfying:

$$R1 < |R2|$$

$$R5 > |R6|$$

where Ri is the radius of curvature of the i-th surface counting from front in said second-image forming lens.

4. A focus detection device according to claim 3, wherein said second-image forming lens has at least one aspheric lens as defined by $$X = \frac{Y^2}{Ra - Ra\sqrt{1 - \left(\frac{Y}{Ra}\right)^2}} +$$

$$BY^4 + CY^6 + DY^8 + EY^{10} + \ldots$$

where Ra is the radius of curvature of the paraxial region, X-axis is in the optical axis with the direction in which the light advances taken as positive, and Y-axis in a direction perpendicular to the X-axis, and the following condition is satisfied:

$$0 > (Ni' - Ni)B$$

where Ni and Ni' are the refractive indices of the media on the front and rear side of said aspheric surface respectively.

5. A focus detection device according to claim 4, wherein said second-image forming lens has mold lenses.

6. A focus detection device according to claim 5, wherein the medium of said first lens is acrylic resin, the medium of said second lens is polycarbonate, and the medium of said third lens is acrylic resin.

7. A focus detection device according to claim 1, wherein said second-image forming lens has a pair of lens groups A arranged on opposite side of an optical axis of said objective lens, said lens group A having from front to rear, a lens A1 with both of the lens surfaces being convex surfaces, a lens A2 with both of the lens surfaces being concave surfaces, and a lens A3 with both of the lens surfaces being convex surfaces.

8. A focus detection device according to claim 7, satisfying:

$$R1 < |R2|$$

$$R5 > |R6|$$

wherein Ri denotes the radius of curvature of the i-th lens surface counting from front in said lens group A.

9. A focus detection device comprising:
an objective lens and a second-image forming lens said second-image forming lens being arranged behind a focal plane of said objective lens to reform the object image formed by said objective lens,
photo-sensitive element groups arranged near a focal plane of said second-image forming lens, for producing output signals representing the light distribution of a reformed object image thereon by said second-image forming lens, said signals being used for detecting when said objective lens is in focus, said second-image forming lens having from front to rear, a first lens with both of the lens surfaces being convex surfaces, a second lens with both of the lens surfaces being concave surfaces, and a third lens with both of the lens surfaces being convex surfaces.

10. A focus detection device according to claim 9, satisfying:

$$R1 < |R2|$$

$$R5 > |R6|$$

wherein letting Ri denote the radius of curvature of the i-th surface counting from front in said second-image forming lens.

* * * * *